(12) United States Patent
Buchner et al.

(10) Patent No.: US 12,253,404 B2
(45) Date of Patent: Mar. 18, 2025

(54) MEASURING METHOD AND MEASURING APPARATUS FOR DETERMINING A FLOW RATE OF A PROCESS GAS

(71) Applicant: AVL LIST GMBH, Graz (AT)

(72) Inventors: Michael Buchner, Graz (AT); Heribert Kammerstetter, Salzburg (AT)

(73) Assignee: AVL LIST GMBH, Graz (AT)

( * ) Notice: Subject to any disclaimer, the term of this patent is extended or adjusted under 35 U.S.C. 154(b) by 316 days.

(21) Appl. No.: 17/775,003

(22) PCT Filed: Nov. 6, 2020

(86) PCT No.: PCT/AT2020/060391
§ 371 (c)(1),
(2) Date: May 6, 2022

(87) PCT Pub. No.: WO2021/087540
PCT Pub. Date: May 14, 2021

(65) Prior Publication Data
US 2022/0357193 A1    Nov. 10, 2022

(30) Foreign Application Priority Data
Nov. 6, 2019   (AT) .............................. A 50950/2019

(51) Int. Cl.
*G01F 25/10*       (2022.01)
*G01F 9/00*        (2006.01)
*G01G 17/06*       (2006.01)

(52) U.S. Cl.
CPC .............. *G01F 9/003* (2013.01); *G01F 25/14* (2022.01); *G01G 17/06* (2013.01)

(58) Field of Classification Search
CPC ........... G01F 25/14; G01F 25/15; G01F 9/003
See application file for complete search history.

(56) References Cited

U.S. PATENT DOCUMENTS 964,956 A * 7/1910 Dezendorf .............. G01F 25/15
48/176
2,672,754 A * 3/1954 Kent, Jr. ................ G01G 19/00
177/190

(Continued)

FOREIGN PATENT DOCUMENTS

CH           384883 A      2/1965
DE        3820336 A1 *    1/1989

(Continued)

OTHER PUBLICATIONS

Pichler K et al: "Kraftstoffverbrauchsmessung—Einfluss Der Systemarchitektur Auf Genauigkeit Und Kosten", MTZ—Motortechnische Zeitschrift, Springer, vol. 57, No. 4, Apr. 1996 (Apr. 1, 1996), pp. 206, XP000582639, ISSN: 0024-8525—No translation available.

(Continued)

*Primary Examiner* — Herbert K Roberts
(74) *Attorney, Agent, or Firm* — Dykema Gossett PLLC (57) ABSTRACT

Various embodiments of the present disclosure are directed to measuring methods for determining a flow rate of a process gas, contained in a gas pressure vessel charged with overpressure, escaping from the gas pressure vessel. In one example embodiment, the method includes: exerting a vessel weight force from the gas pressure vessel together with the contained process gas; compensating for the vessel weight force by means of a counterweight force exerted by a counterweight, or the counterweight force by means of the vessel weight force exerted by the counterweight, at least partially to a resultant measured weight force; determining the measured weight force at at least two points in time; and determining the flow rate of the process gas using the measured weight force determined at the at least two points in time.

17 Claims, 2 Drawing Sheets

(56) References Cited

U.S. PATENT DOCUMENTS

| | | | | |
|---|---|---|---|---|
| 3,105,565 A * | 10/1963 | Pischinger | ............ | G01G 19/00 |
| | | | | 73/114.52 |
| 3,400,577 A * | 9/1968 | List | ........... | G01F 9/003 |
| | | | | 73/114.52 |
| 3,448,609 A * | 6/1969 | Sibeud | ............ | G01F 9/003 |
| | | | | 177/63 |
| 5,335,552 A * | 8/1994 | Hylton | ............ | G01F 25/14 |
| | | | | 73/861 |
| 10,295,516 B2 | 5/2019 | Otaki et al. | | |
| 2017/0089754 A1 * | 3/2017 | Otaki | ............ | G01F 25/15 |
| 2018/0164138 A1 * | 6/2018 | Mudd | ............ | G01F 25/14 |

FOREIGN PATENT DOCUMENTS

| | | | | |
|---|---|---|---|---|
| DE | 19730034 A1 | 2/1999 | | |
| EP | 0095535 A1 * | 12/1983 | | |
| EP | 32997708 A1 | 3/2018 | | |
| GB | 1419893 A * | 12/1975 | ............ | G06F 9/001 |
| JP | H04291122 A | 10/1992 | | |
| JP | 2005134138 A | 5/2005 | | |
| JP | 2017067084 A | 4/2017 | | |
| JP | 2018096847 A | 6/2018 | | |
| SU | 1055992 A1 * | 11/1983 | | |

OTHER PUBLICATIONS

Viktorov V: "Campioni di portata di gas", Oleodinamica, Pneumatica, Tecniche Nuove, Milan, IT, vol. 50, No. 5, May 2009 (May 1, 2009), pp. 76-80, XP001523743, ISSN: 1122-5017. No translation available.

* cited by examiner

MEASURING METHOD AND MEASURING APPARATUS FOR DETERMINING A FLOW RATE OF A PROCESS GAS

CROSS-REFERENCE TO RELATED APPLICATION

This application is a national stage filing based upon PCT application No. PCT/AT2020/060391, filed 6 Nov. 2020, which claims the benefit of priority to Austria application No. A 50950/2019, filed 6 Nov. 2019, both of which are incorporated herein by reference.

BACKGROUND

The present invention relates to a measuring method and a measuring apparatus for determining a flow of a process gas, which is contained in a gas pressure vessel when subjected to overpressure and escapes from the gas pressure vessel with the flow rate, wherein a vessel weight force is exerted from the gas pressure vessel together with the contained process gas.

It is often necessary to determine a flow rate of a process gas very accurately. This can be done by the process gas escaping from a gas vessel and the quantity, i.e. the mass, of the process gas in the gas vessel being determined at a plurality of points in time. The flow rate can be determined from these specific quantities or masses of the process gas, since it is known that a flow rate corresponds to a mass flow.

If the flow rate of the process gas is determined very accurately, it can be used to calibrate flow meters. In general, in the course of a calibration method, a setpoint is compared with an actual value of a measuring apparatus. An accurately known calibration value serves as a setpoint and thus as a reference. In order to calibrate a flow meter, the flow rate, which was determined very accurately using the masses of the process gas at different points in time, can be used as a setpoint. The escaping process gas is supplied to the flow meter. The flow meter measures the flow rate of the process gas as an actual value, which is compared with the setpoint as part of the calibration of the flow meter.

In order to reduce the volume of process gases and thus be able to store a larger quantity of a process gas, the process gas can be subjected to overpressure and stored in a gas pressure vessel. Of course, the overpressure causes increased forces acting on the gas pressure vessel, which is why the gas pressure vessel must be designed with a correspondingly high wall thickness. Cylindrical or spherical gas pressure vessels are preferable as these geometries can withstand higher pressures well. Gas pressure cylinders with a capacity of up to approximately 100 liters are usually used as gas pressure vessels for storing process gases. However, there is also the possibility of storing process gases in large gas reservoirs, which have a capacity of several hectoliters. When selecting the material for the gas pressure vessel and elements that come into contact with the process gas, e.g. closures, valves, lines, etc., care must be taken to ensure that they do not become brittle or otherwise degenerate as a result of the process gas to be used.

In flow measurement technology, CNG (compressed natural gas), LPG (liquefied petroleum gas), H2 (hydrogen) or N2 (nitrogen) are used in particular as process gases.

Compressed natural gas is colloquially referred to as natural gas and is a primary fossil fuel. The main component of compressed natural gas is methane $CH_4$. Methane is gaseous at a temperature of 20° C. and a pressure of 1 bar. CNG is stored under overpressure in gas pressure vessels. However, methane has to be cooled to very low temperatures for liquefaction, with the optimum temperature for liquefaction being a saturation temperature of −161° C., since a gas has the lowest thermal energy at its saturation temperature. Since cooling methane or CNG to −161° C. requires a great deal of effort, CNG is preferably stored in a gaseous rather than a liquid state in gas pressure vessels. Compressed natural gas can then be stored at a process gas temperature of 4° C., for example.

Liquefied petroleum gas (LPG) is also called liquid gas, Autogas or propellant gas and has propane and butane as its main components, with the mixing ratio of liquefied petroleum gas usually varying between 60 percent butane and 40 percent propane or 40 percent butane and 60 percent propane. Liquefied petroleum gas is used to optimize combustion and keep emissions of pollutants low. Liquefied petroleum gas is always stored in gas pressure vessels in liquid form. The boiling point of propane is −42° C. and the boiling point of butane is −0.5° C. Due to these very different boiling points, it is possible to liquefy both gases at a pressure of 20 bar to 80 bar (depending on the prevailing temperature).

At a temperature of 20° C. and a pressure of 1 bar, hydrogen is gaseous, colorless, odorless and non-toxic. As the density of hydrogen is known to be very low, high flow velocities are to be expected. Since hydrogen diffuses easily, it is technically challenging to make connections, lines, etc. sufficiently tight. Hydrogen is combustible and will explode in air even in very small proportions (oxyhydrogen).

As mentioned, process gases have a low density and are therefore stored in gas pressure vessels when subjected to overpressure. Under reference conditions (pressure of 1013 hPa and temperature of 0° C.), hydrogen has a density of 0.08988 $kg/m^3$, whereby hydrogen can reach a density of up to 16 $kg/m^3$ at an overpressure of 200 bar and a temperature of 20° C. Under the above reference conditions, butane has a density of 2.3 $kg/m^3$ and at an overpressure of 200 bar and a temperature of 20° C., butane has a density of up to 476 $kg/m^3$. Under the above reference conditions, propane has a density of 1.8 $kg/m^3$ and at an overpressure of 200 bar and a temperature of 20° C., propane has a density of up to 360 $kg/m^3$.

A process gas is therefore usually exposed to an overpressure of up to 250 bar and can also be stored at even higher overpressures. However, process gas pressures of more than 250 bar are often not economical, since the associated gas pressure vessel must be extremely solid and therefore have a very high mass. But even for process gas pressures of up to 250 bar, gas pressure vessels with a mass of up to 100 kilograms are common. However, such a gas pressure vessel can only hold a process gas with a mass of less than one kilogram, and for hydrogen as the process gas only approximately 400 to 500 grams. This therefore leads to a very unfavorable ratio of the mass of the gas pressure vessel to the process gas.

In order to determine the quantity of the process gas at a given point in time, the total mass of the gas pressure vessel including the process gas can be measured using a process scale when the mass of the gas pressure vessel is known, and the mass of the process gas can be calculated therefrom. A process scale must therefore be selected that is able to measure the total mass of the gas pressure vessel and the process gas, even though the process gas itself only makes up a fraction (usually around one two-hundredth) of the total mass. However, process scales with an absolute measuring range in the range of this total mass have a limited resolution. With justifiable measuring accuracy, this leads to high minimum consumption of process gases, which results in long measuring times. These long measuring times in turn lead to long downtimes of the flow meter to be calibrated. For very accurate calibrations, it may be the case that the quantity of stored process gas is not sufficient for adequately long measuring times.

U.S. Pat. No. 10,295,516 describes a calibration device for a flow meter for filling hydrogen filling stations. The calibration device must be designed to be transportable, which means that uncompromising accuracy cannot be required. However, calibrations with measurement errors of up to 0.5% are still possible.

It is an object of the present invention to specify a measuring apparatus and a measuring method which enable measuring a flow rate of a process gas with very high accuracy and low measurement error.

SUMMARY OF THE INVENTION

This object is achieved according to the invention in that the vessel weight force is compensated for at least in part by a counterweight force exerted by a counterweight or the counterweight force is compensated for at least in part by the vessel weight force exerted by the counterweight to form a resultant measured weight force, wherein the measured weight force is determined at at least two points in time, and the flow rate of the process gas is determined using the measured weight force determined at at least two points in time.

Furthermore, the object is achieved by a measuring apparatus in which a counterweight is provided, the counterweight being connected to the gas pressure vessel via a compensation apparatus and exerting a counterweight force, wherein the compensation apparatus is designed in such a way that the vessel weight force compensates for the counterweight force at least in part or the counterweight force compensates for the vessel weight force at least in part to form a resultant measured weight force, wherein a process scale is provided, which is designed to determine the measured weight force at at least two points in time, and wherein an evaluating unit is provided, which is connected to the process scale and is designed to determine the flow rate of the process gas using the measured weight force determined at at least two points in time.

The process gas can escape from the gas pressure vessel by controlled extraction. As is well known, a weight force results from the product of a mass and the occurring gravitational acceleration (usually 9.81 m/s$^2$) and acts "downwards", i.e. towards the center of the earth. This relationship between mass and weight force can be used to convert mass to weight and vice versa using the gravitational acceleration. The weight force of the gas pressure vessel together with the process gas weight of the process gas is regarded as the vessel weight force. The vessel weight force can also include an additional weight force caused by other elements (valves, lines, suspension, etc.) connected to the gas pressure vessel, with this additional weight force preferably being constant. It is therefore advantageous if the process gas pressure in the hydraulic lines of the measuring apparatus is constant in order to keep the additional weight force of the hydraulic lines as constant as possible.

According to the invention, the measured weight force results from the vessel weight being compensated for by the counterweight or from the counterweight being compensated for by the vessel weight. According to the invention, the process scales therefore do not measure the entire vessel weight, but rather the measured weight force. Since the process gas escapes from the gas pressure vessel, the measured weight changes over time. The flow rate of the process gas can thus be determined by determining the measured weight force at at least two points in time. The value of the measured weight force determined at one point in time is not necessarily relevant for determining the flow rate. Rather, the relationship between the measured weight forces determined at at least two points in time is decisive for determining the flow rate. For example, a difference or a course of the measured weight force can be viewed over time. Since the measured weight force is less than the vessel weight force, a precision scale with a small absolute measuring range and the associated higher resolution can be used as the process scale. In this way, the flow rate can be determined more accurately.

The process scale is preferably connected to the gas pressure vessel in order to determine the vessel weight force, which is compensated for at least in part by the counterweight force, as the measured weight force.

The process scale can also be connected to the counterweight in order to determine the counterweight force, which is compensated for at least in part by the vessel weight force, as the measured weight force.

The compensation apparatus preferably comprises a connecting element, wherein the connecting element is divided into a first side and a second side by a bearing point and is designed to be pivotable about the bearing point, wherein the gas pressure vessel is connected to the first side and the counterweight is connected to the second side. This results in a rocker due to the connecting element that can be pivoted about the bearing point. The connecting element is preferably designed to be rigid.

The compensation apparatus may also comprise a connecting element, which is divided into a first side and a second side by a bearing point, which is connected to the gas pressure vessel and the counterweight, wherein the connecting element is not designed to be pivotable about the bearing point, but is designed to be displaceable, for example, through the bearing point. Thus, the connecting element can be moved, for example, through the bearing point, with which the length of the first side and the second side can be changed depending on the position of the connecting element. For example, the connecting element can be designed to be flexible at least in part, for example as a rope.

The gas pressure vessel, the counterweight and the compensation apparatus are preferably designed in such a way that when the gas pressure vessel is empty, the measured weight force corresponds to a mass in the range from 1 g to 2 kg, preferably 1 g to 200 g, particularly preferably 1 g to 100 g. The counterweight force compensates for the vessel weight force or vice versa to a large extent. In this way, a process scale with the maximum possible resolution can be selected and the measured weight force can be determined very accurately.

Provision can also be made for the counterweight force to compensate for the vessel weight force or vice versa (to a biasing force) which corresponds to 1 g to 1.5 kg, particularly preferably 500 g to 1 kg. Of course, the measuring range of the process scale must always be selected appropriately.

It is also possible for the counterweight force to completely compensate for the vessel weight force of the empty gas pressure vessel, with the result that the measured weight force corresponds directly to the process gas weight force.

The escaping process gas can be supplied to a flow meter, wherein the determined flow rate of the escaping process gas is used to calibrate the flow meter. The flow rate through the flow meter is thus determined and compared with the flow rate according to the invention, and determined with high accuracy. Based on this comparison, the flow meter can be readjusted.

BRIEF DESCRIPTION OF THE DRAWINGS

In the following, the present invention shall be described in greater detail with reference to FIGS. 1 to 3, which show exemplary, schematic and non-limiting advantageous embodiments of the invention. In the drawings.

DETAILED DESCRIPTION

Figure 1:
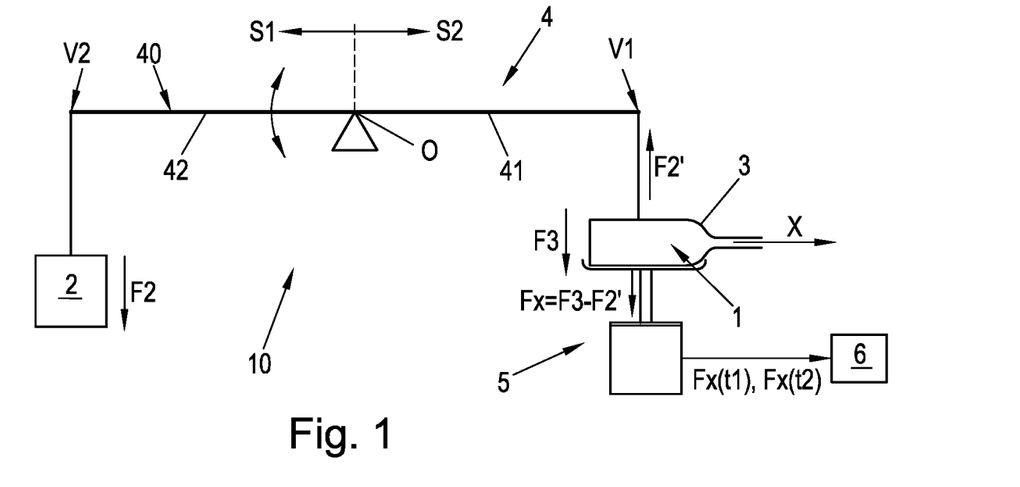
FIG. 1 shows a first preferred embodiment of the measuring apparatus.
Figure 2:
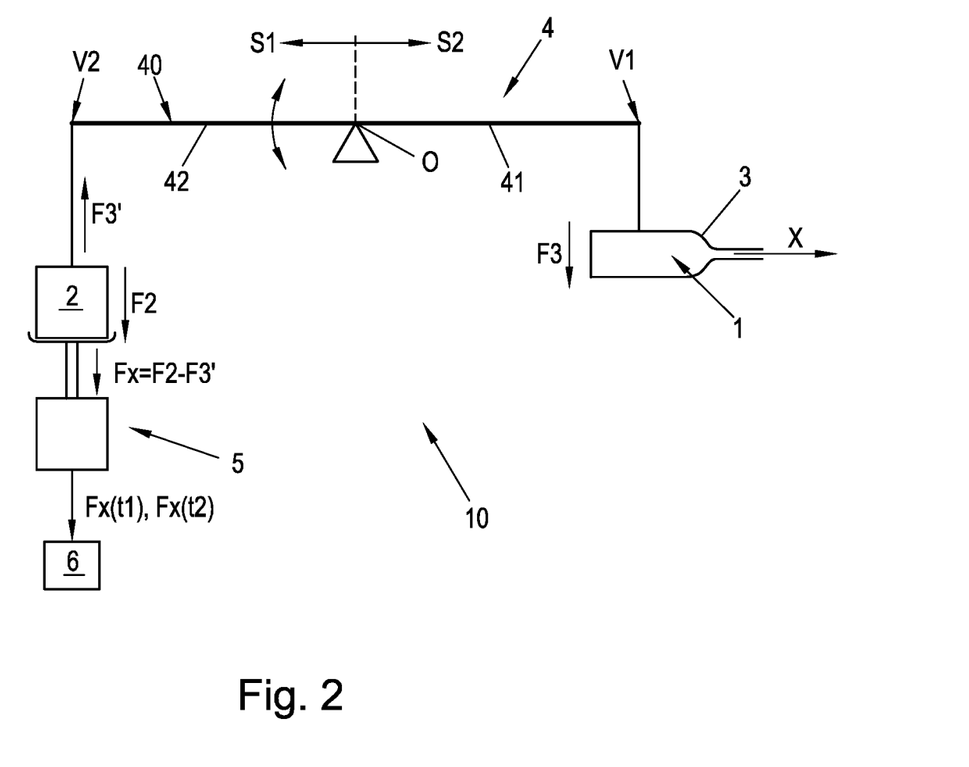
FIG. 2 shows a second preferred embodiment of the measuring apparatus.

FIGS. 1 and 2 each show a preferred embodiment of the measuring apparatus 10 according to the invention. A process gas 1 is subjected to overpressure in a gas pressure vessel 3 and escapes therefrom with the flow rate X. A vessel weight force F3 acts on the gas pressure vessel 3 together with the process gas 1 contained therein, i.e. the gas pressure vessel 3 together with the process gas 1 contained therein causes a vessel weight force F3. Weight forces which are caused by elements (valves, lines, etc.) connected to the gas pressure vessel 3 can also count towards the vessel weight force F3.

A counterweight 2, from which a counterweight force F2 is exerted, is provided. In other words, the counterweight 2 brings about a counterweight force F2. The counterweight 2 is connected to the gas pressure vessel 3 via a compensation apparatus 4 and thus compensates for the vessel weight F3 at least in part. In the case shown, a vessel compensation force F2' is caused by the counterweight force F2 via the compensation apparatus 4 on the gas pressure vessel 3. The vessel compensation force F2' acts against the vessel weight force F3 and thus compensates for it at least in part, preferably for the most part. Depending on the configuration of the compensation apparatus 4, the vessel compensation force F2' can also correspond to the counterweight force F2.

In the embodiment shown, the compensation apparatus 4 comprises a connecting element 40. The connecting element 40 is divided into a first side 41 and a second side 42 by a bearing point O and is designed to be pivotable about the bearing point O. The gas pressure vessel 3 is connected to the first side 41 via a first connection point V1 and the counterweight 2 is connected to the second side 42 via a second connection point V2. The ratio of compensating force F2' and counterweight force F2 is therefore dependent on the design of the connecting element 40, in particular on leverage effects that arise as a result of the ratio of the distance between the first connection point V1 and the bearing point O to the distance between the second connection point V2 and the bearing point O. This ratio of the distances of the connection points from the bearing point O can be selected in order to set the ratio of the compensating force F2' to the counterweight force F2.

The connecting element 40 and/or the bearing point O is preferably designed in such a way that the friction between the connecting element 40 and the bearing point O is as low as possible in order to influence the measuring process as little as possible. The connecting element 40 is preferably reinforced at least in a contact region with the bearing point O with a hard material, preferably tungsten carbide, or the connecting element 40 is made of a hard material, preferably tungsten carbide, at least in the contact region with the bearing point.

The use of ball bearings or roller bearings is conceivable. An even lower friction can be generated by configuring the bearing point O in the form of a cutting edge (prism). The connecting element 40 can thus be mounted on the bearing point O (corresponding to the cutting edge) in a contact region—as is indicated in the Figures.

The smaller, for example narrower, the contact region in the bearing point O, the lower the friction, wherein a small contact region also increases abrasion of the bearing point O and abrasion of the connecting element 40 in the contact region. It is therefore advantageous to use hard materials for the connecting element 40 and the bearing point O in the contact region.

The bearing point O can also be designed as a mounting suspension for the connecting element 40. A rope can serve as a suspension, wherein special materials such as carbon fibers, which have a high degree of flexibility and high load-bearing capacity at the same time, are preferably used. Corresponding ropes with a thickness of less than one millimeter can be manufactured, which, however, have a load-bearing capacity of several hundred kilograms. Ropes made from carbon nanotubes (CNT) are thinner than carbon fibers and still have a load-bearing capacity of several hundred kilograms. Experimentally, friction-related measuring influences of less than 5 mg could be achieved, which is within the range of the resolution of common process scales 5.

The measuring apparatus 10 is preferably decoupled from the environment, in particular from a subsoil, at a large extent, particularly preferred completely. In this way, a transmission of pulsations and/or vibrations from the environment (e.g. the subsoil) to the measuring apparatus 10 can be prevented, with the result that disruptions during the measuring process are minimized. The first preferred embodiment according to FIG. 1 and the second preferred embodiment according to FIG. 2 differ in the positioning of the process scale 5.

In FIG. 1, the process scale 5 is connected to the gas pressure vessel 3 in order to determine the measured weight force Fx as the vessel weight force F3 which is compensated for at least in part by the counterweight force F2 (in this case via the vessel compensation force F2').

In FIG. 2 the process scale 5 is connected to the counterweight 2 in order to determine the measured weight force Fx as a counterweight force F2 which is compensated for at least in part by the vessel weight force F3. A counterweight compensation force F3' is caused by the vessel weight force F3 via the compensation apparatus 4 on the counterweight 2. This counterweight compensation force F3' acts against the counterweight force F2 and thus compensates for it in part, and preferably largely. The counterweight compensation force F3' can also correspond to the vessel weight force F3 of the empty gas pressure vessel 3 depending on the configuration of the compensation apparatus 4.

In FIG. 2, as in FIG. 1, the compensation apparatus 4 comprises, for example, a connecting element 40 which is divided into a first side 41 and a second side 42 by a bearing point O and is designed to be pivotable about the bearing point O. The gas pressure vessel 3 is connected to the first side 41 via a first connection point and the counterweight 2 is connected to the second side 42 via a second connection point. The ratio of the counterweight compensation force F3' and the vessel weight force F3 is therefore dependent on the design of the connecting element 40, in particular on leverage effects that arise as a result of the ratio of the distance between the first connection point and the bearing point O to the distance between the second connection point and the bearing point O. This ratio of the distances of the connection points from the bearing point O can be selected in order to set the ratio of the counterweight compensation force F3' and the vessel weight force F3.

In order to use a leverage effect, for example in the second preferred embodiment according to FIG. 2, the first connection point V1 of the gas pressure vessel 3 on the first connection side 41 can be further away from the bearing point O by a factor f than the second connection point V2 of the counterweight 2 on the second connection side 42 is away from the bearing point O, for example by a factor of 10. The counterweight compensating force F3' thus corresponds to f times (e.g. ten times) the vessel weight force F3, which is why the counterweight force can only be one fth (e.g. tenth). It should be noted that each local inhomogeneous temperature change on the first connection side 41 has an increased effect on the measurement by factor f. A housing, preferably with temperature conditioning and/or air pressure regulation, is therefore particularly advantageous when using leverage effects. The factor f can be greater, but also less than one. In the latter case, there is a leverage effect from the second connection side 42 to the first connection side 41.

Corresponding use of the leverage effect (with a factor f of less than or greater than one) can also be used analogously in the first preferred embodiment according to FIG. 1.

The process scale 5 measures the vessel weight force F3 compensated for at least in part by the counterweight force F2 (FIG. 1) or the counterweight force F2 compensated for at least in part by the vessel weight force F3 (FIG. 2) as the measured weight force Fx.

In the first case, the measured weight force Fx results from the difference between the vessel weight force F3 and the vessel compensation force F2' caused by the counterweight force F2: Fx=F3−F2'. In the second case, the measured weight force Fx results from the difference between the counterweight force F2 and the counterweight compensation force F3' caused by the vessel weight force F3: Fx=F2−F3'.

The process gas 1 escapes from the gas pressure vessel 3 with a flow rate X, whereby a controlled extraction of the process gas 1 can be carried out with the flow rate X. This escape/extraction is shown schematically in the drawings as an arrow starting from the gas pressure vessel 3. Since the vessel weight force F3 changes with the quantity of the process gas 1 in the gas pressure vessel 3, the measured weight force Fx also changes with the flow rate X in both cases.

The absolute quantity of the process gas 1 can be determined, for example, by the counterweight force F2 completely compensating for the vessel weight force F3 of the empty gas pressure vessel 3 using the first embodiment, since in this case the measured weight force Fx corresponds to the process gas weight force. However, knowledge of the absolute quantity of the process gas 1 located in the gas pressure vessel 3 is not absolutely necessary for determining the flow rate X.

Rather, the measured weight force Fx is determined at at least two points in time t1, t2 and transmitted to the evaluating unit 6, which determines the flow rate X therefrom. This can be done by viewing the course of the measured weight force Fx. The flow rate X can also be determined by forming a difference between the measurement weight forces Fx determined at two or more different points in time t1, t2. Since the measured weight force Fx is less than the vessel weight force F3, a process scale 6 with a smaller absolute measuring range and therefore a higher resolution can be used.

The measuring apparatus 10 is advantageously housed. It can thus be prevented that influences, for example an air pressure fluctuation, temperature fluctuation, etc., have an impact on the measurement, in particular on the process scale 5, hydraulic connecting lines 41, etc. Likewise, it is possible to prevent the longitudinal expansion of components that are used to fasten and/or connect elements of the measuring apparatus, such as ropes, supports, etc., from varying. It is advantageous if materials are used in the measuring apparatus 10 (gas pressure vessel 3, connecting element 40, counterweight 2, components for fastening and/or connecting elements, etc.) whose material properties (e.g. the material density) depend as little as possible on the temperature. The use of the material Invar is therefore particularly advantageous. The housing is preferably subjected to a slight overpressure, for example 100 mbar. In order to keep this overpressure constant, an IP converter and a pressure sensor can be provided. In addition, a throttle can be provided in order to make an even finer adjustment of the pressure possible. It is fundamentally advantageous if the air pressure in the measuring apparatus 10 is kept as constant as possible.

Furthermore, the process scale 5 can be kept at a constant temperature, which is beneficial for the accuracy of the process scale 5 itself. A housing can also be advantageous for this purpose.

Figure 3:
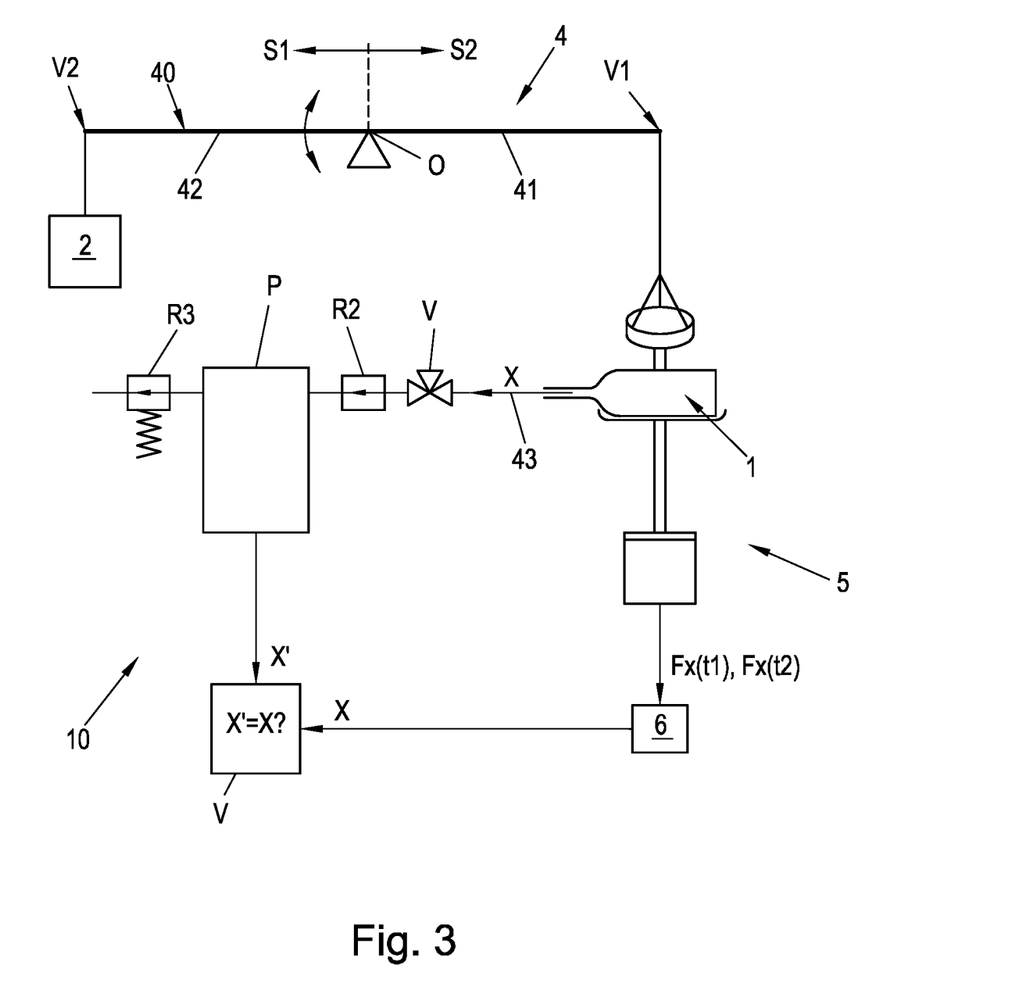
FIG. 3 shows a calibration of a flow meter.

FIG. 3 shows the use of a measuring apparatus 10 as a calibration system. The measured weight force Fx is determined at at least two points in time and the flow rate X of the process gas 1 escaping from the gas pressure vessel 3 is determined therefrom in the evaluating unit 6. As a result of the high accuracy of the measuring method according to the invention, the flow rate X is known very accurately and can be used to calibrate a flow meter P as a test specimen. For this purpose, the process gas 1 flows via a hydraulic connecting line 41 from the gas pressure vessel 2 into the flow meter P. The flow rate X' of the process gas 1 determined by the flow meter P is compared to the flow rate X determined by the evaluating unit 6 in order to calibrate the flow meter P, which takes place in a comparison unit V in this case. The comparison unit V can also be an integral component of the evaluating unit 6.

At the beginning of the measuring process, the desired flow rate X of the process gas 1 is generated—preferably as quickly as possible—which can be done by a rising ramp in the flow rate X. The flow rate X is preferably kept constant during the further course of the measuring process. In principle, the flow rate X determined by the measuring apparatus 10 can be used to check the current flow rate X. However, the flow rate X' measured by the flow meter P can also be used. At the end of the measuring process, the flow rate X is reduced, preferably to zero, which can be done by a falling ramp in the flow rate X. The rising and/or falling ramp is preferably selected to be as short as possible in each case in order to generate the greatest possible ratio of the duration of the measuring process to the ramps, with the result that measurement errors based thereon can be reduced or prevented. This can be done experimentally, in particular for unknown flow meters P, by carrying out a number of measuring processes, wherein the duration of the respective measuring process is increased until the measured deviations no longer change significantly.

During the measuring process, the measured weight force Fx is recorded by the process scale 5, for example at two points in time t1, t2, and transmitted to the evaluating unit 6, which in turn determines the flow rate X. The flow meter P also determines the flow rate X' between the first point in time t1 and the second point in time t2. The flow meter P can be calibrated depending on the deviation of the flow rate X' determined by the flow meter P from the flow rate X determined by the measuring apparatus. This can be done by adjusting the adjustment parameters of the flow meter P. The possibilities and procedures for calibrating a flow meter P are known in principle, which is why they are not discussed in detail at this point. It is essential that the flow rate X determined according to the invention is used as a reference value for the flow rate X' determined by a flow meter P, with which the flow meter P is calibrated.

In order to rule out any unknown interference factors as far as possible, it is advantageous to repeat the calibration process several times, preferably six to ten times, for each flow rate X' to be calibrated. The final deviation of the flow rate X' measured by the flow meter P from the flow rate X determined by the measuring apparatus 10 can be specified in the test specimen logs.

A first pressure regulator R1 is preferably arranged in or (preferably rigidly) on the gas pressure vessel 3 in order to keep a line pressure in the hydraulic connecting line 41 constant to prevent a measurement error based thereon. This can also prevent the volume of the hydraulic line 41 itself from changing due to a changing pressure of the process gas in the hydraulic connecting line 41, which could also lead to a measurement error. To enable filling of the gas pressure vessel 3 despite the use of a first outlet pressure regulator R1, a (preferably zero-bar) check valve can be integrated into the first pressure regulator R1. A valve V is preferably also provided in the hydraulic line 41 in order to start and stop the calibration. If the valve V is designed as a ⅔-way valve, the third path can be used to fill the gas pressure vessel 3 with process gas 1.

The final test pressure of the escaping process gas 1 at the flow meter P can be generated using a second pressure regulator R2 arranged upstream of the flow meter P and a third pressure regulator R3 arranged downstream of the flow meter P. The flow meter generates a pressure drop in the process gas flowing through 1. The third pressure regulator R3 regulates the pressure of the process gas on the hydraulic line 41 downstream of R2. The maximum available pressure of the process gas 1 at the flow meter P is limited by the hydraulic line pressure. The gas pressure available due to the pressure regulator R2 in the hydraulic line 41 and thus at the flow meter P is therefore preferably adapted to the flow meter P and can be 20 bar, for example. Preferably, the first pressure regulator R1 and/or the second pressure regulator R2 and/or the third pressure regulator R3 and/or the valve V can be remotely controlled, for example via servomotors and/or IP converters. Control methods which themselves generate little or no heat are particularly advantageous. The gas pressure vessel 2 is preferably not emptied in such a way that the process gas pressure in the gas pressure vessel 2 falls below the line gas pressure defined by the pressure regulator R1. A precision pressure sensor can be used to measure the line pressure in order to also keep the absolute pressure in the hydraulic line 41 constant, whereby the detection of a relative line pressure change can be sufficient.

A throttle can also be provided instead of the first pressure regulator R1 and/or the second pressure regulator R2 and/or the third pressure regulator R3.

If the gas pressure vessel 3 is connected to a wall of a housing via hydraulic (and/or electrical) connecting lines 41, these are preferably designed to be highly flexible while at the same time being pressure-resistant in order to keep mechanical stresses between the gas pressure vessel 3 and the housing low. For example, corrugated pipes, preferably made of stainless steel, can be used as connecting lines 41. In order to keep the total mass of the connecting lines 41 low, the smallest possible line diameter, preferably 8 mm, can be selected. In general, the hydraulic connecting lines 41 are designed in such a way that the pressure drop at an intended maximum flow rate is smaller than a pressure difference between the outlet pressure regulator R1 and the other outlet pressure regulator R2.

Hydraulic (and/or electrical) connecting lines 41 preferably leave the gas pressure vessel 3 vertically and are formed to the largest possible radius, e.g. in the direction of the flow meter P, whereby the principle of leverage is used, since the differential force caused by a change in position of the gas pressure vessels 3 decreases with the length of the connecting lines 41. Furthermore, the hydraulic (and/or electrical) connecting lines 41 can be designed as a spiral.

A further reduction in a measurement error can be achieved by introducing a minimum settling time for the flow rate of the escaping process gas 1 before and after each measuring process. A ramped increase in the flow rate X and X' at the start of the measuring process and a ramped decrease in the flow rate X and X' at or before the end of the measuring process can thus be provided, with the ramps being able to be a component of the measuring process. In particular, the ramped increase can ensure that the flow meter P supplies correct measurement results to be calibrated during the constant flow rate X. The process scale 5 can also achieve its maximum accuracy after a sufficient settling time.

When used as a calibration system, the measuring apparatus 10 must be "returned" to an international standard several times during its service life or period of use, with transfer standards being used. For this purpose, a receptacle, for example a receptacle cup, can be provided on the gas pressure vessel 3 and/or the counterweight 2, as indicated in FIG. 3. The measuring system can be calibrated with the aid of this/these receptacle(s), for example by inserting precision weights into the receptacle(s). This is easy to carry out, but automatic positioning of the precision weights can also be considered, with which influences on the measuring process can be reduced compared to manual positioning.

By using (high) precision weights as transfer standards, the measuring apparatus 10 can be calibrated, for example returned to a national primary standard. To calibrate the measuring apparatus 10, a value determined by the process scale 5 is determined at a first point in time, taking into account the measured weight force Fx. A (high) precision weight is then placed in a tray on the process scale 5. The tray for this (high) precision weight, in particular on the gas pressure vessel 3, is preferably designed in such a way that it acts on the process scale 5 in an equivalent manner to a change in the quantity of the process gas 1. After a settling time, the measured weight force Fx is determined by the process scale 5 at a second point in time. The mass of a (high) precision weight is determined in exactly the same way as the flow rate X of a process gas 1. The difference between the two measured weight forces Fx displayed should correspond exactly to the (high) precision weight. If the difference deviates from the (high) precision weight, there are systematic and/or statistical deviations, which are shown and reported by the calibration of the measuring apparatus 10. If it is structurally ensured that the tray is located in the center of gravity of the gas pressure vessel 3, it can be assumed that a process gas 1 with the same mass that is in the gas pressure vessel 2 will deliver the same results. Using different precision weights, different flow rates X of process gases 1 can be calibrated and/or the measuring apparatus 10 can be adjusted during commissioning.

For each calibration point, a separate transfer standard, which has been optimally selected for this calibration point, can be used in order to achieve maximum calibration accuracy. How often such a calibration is planned must be coordinated with the national bureau of standards. Details are regulated in the ISO 17025:2018 standard.

A calibration flow meter placed in place of the flow meter P can also be used as a transfer standard. This calibration flow meter is preferably technically identical to a flow meter P, but fundamentally has a very high level of accuracy and, moreover, is usually only used in that region in which it has maximum accuracy. "Normal" flow meters P, on the other hand, are calibrated by the measuring apparatus 10 over the entire measuring range of the flow meter P. The calibration flow meter as a transfer standard is therefore not calibrated itself, but is used to calibrate the measuring apparatus 10. It is also possible to check the measuring apparatus 10 using another transfer standard, for example using a Coriolis sensor and/or a Venturi nozzle.

The invention claimed is:

1. Measuring method for determining a flow rate of a process gas, contained in a gas pressure vessel charged with overpressure, and escaping from the gas pressure vessel with the flow rate, wherein the method including the following steps:
   exerting a vessel weight force from the gas pressure vessel together with the contained process gas,
   compensating for the vessel weight force by means of a counterweight force exerted by a counterweight, or the counterweight force by means of the vessel weight force exerted by the counterweight, at least partially to a resultant measured weight force,
   determining the measured weight force at at least two points in time, and
   determining the flow rate of the process gas using the measured weight force determined at the at least two points in time.

2. The measuring method of claim 1, wherein the escaping process gas is supplied to a flow meter, and wherein the determined flow rate of the escaping process gas is used to calibrate the flow meter.

3. A measuring apparatus for determining a flow rate of a process gas, which is contained in a gas pressure vessel when charged with overpressure, and which escapes from the gas pressure vessel with the flow rate, wherein a vessel weight force is exerted from the gas pressure vessel together with the contained process gas, the measuring apparatus comprising:
   a compensation apparatus;
   a counterweight connected to the gas pressure vessel via the compensation apparatus and configured to exert a counterweight force;
   wherein the compensation apparatus is configured so that the vessel weight force compensates for the counterweight force or the counterweight force compensates for the vessel weight force at least in part, to form a resultant measured weight force;
   a process scale configured to determine the measured weight force at at least two points in time; and
   an evaluating unit connected to the process scale and configured to determine the flow rate of the process gas using the measured weight force determined at the at least at two points in time.

4. The measuring apparatus of claim 3, wherein the process scale is connected to the gas pressure vessel and is configured to determine the vessel weight force, and the vessel weight force is compensated for at least in part by the counterweight force, as the measured weight force.

5. The measuring apparatus of claim 3, wherein the process scale is connected to the counterweight and is configured to determine the counterweight force, and the counterweight force is compensated for at least in part by the vessel weight force, as the measured weight force.

6. The measuring apparatus of claim 3, wherein the compensation apparatus comprises a connecting element divided into a first side and a second side by a bearing point, and the connecting element is configured to be pivotable about the bearing point, and the gas pressure vessel is connected to the first side and the counterweight is connected to the second side.

7. The measuring apparatus of claim 3, wherein the gas pressure vessel, the counterweight and the compensation apparatus are configured in such a way that when the gas pressure vessel is empty, the measured weight force corresponds to a mass in the range from 1 g to 2 kg.

8. The measuring apparatus of claim 4, wherein the compensation apparatus includes a connecting element divided into a first side and a second side by a bearing point, the connecting element configured to be pivoted about the bearing point, and the gas pressure vessel is connected to the first side and the counterweight is connected to the second side.

9. The measuring apparatus of claim 5, wherein the compensation apparatus includes a connecting element divided into a first side and a second side by a bearing point, the connecting element configured to be pivoted about the bearing point, and the gas pressure vessel is connected to the first side and the counterweight is connected to the second side.

10. The measuring apparatus of claim 4, wherein the gas pressure vessel, the counterweight and the compensation apparatus are configured in such a way that when the gas pressure vessel is empty, the measured weight force corresponds to a mass in the range from 1 g to 2 kg.

11. The measuring apparatus of claim 5, wherein the gas pressure vessel, the counterweight and the compensation apparatus are configured in such a way that when the gas pressure vessel is empty, the measured weight force corresponds to a mass in the range from 1 g to 2 kg.

12. The measuring apparatus of claim 7, wherein the measured weight force corresponds to a mass in the range of 1 g to 200 g.

13. The measuring apparatus of claim 7, wherein the measured weight force corresponds to a mass in the range of 1 g to 100 g.

14. The measuring apparatus of claim 10, wherein the measured weight force corresponds to a mass in the range of 1 g to 200 g.

15. The measuring apparatus of claim 10, wherein the measured weight force corresponds to a mass in the range of 1 g to 100 g.

16. The measuring apparatus of claim 11, wherein the measured weight force corresponds to a mass in the range of 1 g to 200 g.

17. The measuring apparatus of claim 11, wherein the measured weight force corresponds to a mass in the range of 1 g to 100 g.

\* \* \* \* \*